US009823104B2

(12) United States Patent
Rowe et al.

(10) Patent No.: US 9,823,104 B2
(45) Date of Patent: Nov. 21, 2017

(54) ACQUATIC VELOCITY SCANNING APPARATUS AND METHODS

(71) Applicant: Rowe Technologies, Inc., Poway, CA (US)

(72) Inventors: Francis Rowe, Poway, CA (US); Marc Parent, Windham, NH (US)

(73) Assignee: Rowe Technologies, Inc., San Diego, CA (US)

( * ) Notice: Subject to any disclaimer, the term of this patent is extended or adjusted under 35 U.S.C. 154(b) by 497 days.

(21) Appl. No.: 13/773,447

(22) Filed: Feb. 21, 2013

(65) Prior Publication Data

US 2014/0230567 A1  Aug. 21, 2014

(51) Int. Cl.
| | | |
|---|---|---|
| *G01F 1/66* | (2006.01) |
| *G01S 7/524* | (2006.01) |
| *G01F 1/00* | (2006.01) |
| *G01S 7/527* | (2006.01) |
| *G01S 15/58* | (2006.01) |

(52) U.S. Cl.
CPC .............. *G01F 1/667* (2013.01); *G01F 1/002* (2013.01); *G01F 1/663* (2013.01); *G01S 7/524* (2013.01); *G01S 7/527* (2013.01); *G01S 15/582* (2013.01)

(58) Field of Classification Search
CPC .......... G01F 1/667; G01F 1/663; G01F 1/002; G01S 7/524; G01S 15/582; G01S 7/527
USPC .......................................................... 367/90
See application file for complete search history.

(56) References Cited

U.S. PATENT DOCUMENTS

| | | | |
|---|---|---|---|
| 5,077,700 A | 12/1991 | Shaw et al. |
| 5,122,990 A | 6/1992 | Deines et al. |
| 5,208,785 A | 5/1993 | Brumley et al. |
| 5,343,443 A | 8/1994 | Merewether |
| 5,615,173 A | 3/1997 | Brumley |
| 5,617,865 A | 4/1997 | Palczewska et al. |
| 5,689,445 A | 11/1997 | Vogt et al. |
| 5,808,967 A | 9/1998 | Yu et al. |
| 5,923,617 A | 7/1999 | Thompson et al. |
| 6,052,334 A | 4/2000 | Brumley et al. |
| 6,097,671 A * | 8/2000 | Merewether ................. 367/173 |
| 6,282,151 B1 | 8/2001 | Brumley et al. |
| 6,647,804 B1 | 11/2003 | Deines |
| 6,678,210 B2 | 1/2004 | Rowe |

(Continued)

FOREIGN PATENT DOCUMENTS

| | | |
|---|---|---|
| CN | 1117139 A | 2/1996 |
| CN | 1901837 A | 1/2007 |
| WO | WO-2010111157 A1 | 9/2010 |

OTHER PUBLICATIONS

Blair H. Brumley, et al., "Performance of a Broad-Band Acoustic Doppler Current Profiler", IEEE Journal of Oceanic Engineering, vol. 16, No. 4, Oct. 1991, pp. 402-407.

(Continued)

*Primary Examiner* — Luke Ratcliffe
*Assistant Examiner* — Amie M N'Dure
(74) *Attorney, Agent, or Firm* — Gazdzinski & Associates, PC

(57) ABSTRACT

Apparatus and methods for velocity scanning in, e.g., bodies of water. In one embodiment, a scanned one-dimensional transducer array Doppler sonar arrangement is used to remotely measure both vertical and horizontal profiles of a river or channel along-stream water velocities within a cross-section of the river/channel from a single side-mounted sonar.

22 Claims, 9 Drawing Sheets

(56) References Cited

U.S. PATENT DOCUMENTS

| | | |
|---|---|---|
| 6,700,834 B2 | 3/2004 | Brumley et al. |
| 6,714,482 B2 | 3/2004 | Rowe |
| 7,317,660 B2 | 1/2008 | Brumley et al. |
| 7,542,374 B2 | 6/2009 | Brumley et al. |
| 7,847,925 B2 | 12/2010 | Vogt et al. |
| RE43,090 E | 1/2012 | Rowe |
| 8,411,530 B2 * | 4/2013 | Slocum et al. ............... 367/90 |
| 2003/0076742 A1 | 4/2003 | Rowe |
| 2006/0155492 A1 | 7/2006 | Strong et al. |
| 2008/0080313 A1 * | 4/2008 | Brumley et al. ............... 367/89 |
| 2008/0080314 A1 | 4/2008 | Brumley et al. |
| 2009/0052282 A1 | 2/2009 | Strong et al. |
| 2009/0182237 A1 | 7/2009 | Angelsen et al. |
| 2010/0142324 A1 | 6/2010 | Vogt |
| 2010/0157739 A1 | 6/2010 | Slocum et al. |
| 2010/0195443 A1 | 8/2010 | Lawhite et al. |
| 2011/0075518 A1 | 3/2011 | Huhta et al. |
| 2012/0106299 A1 | 5/2012 | Rowe et al. |

OTHER PUBLICATIONS

IEEE Ultrasonics Symposium pp. 1231.
Frazier, "A two-dimensional amplitude-steered array for real-time volumetric imaging," Doctoral Thesis, University of Illinois at Urbana-Champaign, pp. 170 (Apr. 2000).
Doppler Solutions, Feb. 28, 2003.
S. Chunying, Hzhou, H. Huang, "Radar clutter suppression using adaptive algorithms"; Aerospace conference 2004, IEEE proceedings, vol. 3.
J.Goss, J. Chrisman, "An introduction to WSR-88C clutter suppression", NEXTRAD weather service.
J. Bird, "Coherent Clutter Removal and Doppler Etimatiomn", Simon Frazer University, 2012.
Moore, S., Le Coz, J., Pierrefeu, G., Perret, C., Hurther, D., Paquier, A., "Measuring river flow using side-looking Acoustic Doppler Current Profilers: a comparison to vertically-oriented ADCP results" (2009).
Ramon Cabrera; Jerry Mullison; and Daryl Slocum, American Society of Civil Engineers, Side Looking Doppler Velocity Sensors, Jul. 30-Aug. 2, 2000.
Morlock, S.E., 1994, Evaluation of acoustic Doppler current profiler measurements of river discharge: "U.S. Geological Survey Water-Resources Investigation Report 95-4218, 37".
Ruhl, C.A., and Simpson, M.R., 2005, "*Computation of discharge using the index-velocity method in tidally affected areas*", U.S. Geological Survey Scientific Investigations Report 2005-5004, 31
H.Hidayat, B. Vermeulen, M.G. Sassi, P. Torts, A. Hoitink, "Discharge estimating inn a backwater affected neandering river", Mar. 2011.
J. LeCoz, G.Pierrefeu, A. Paquier, "Evaluation of river discharges monitored by a fixed sidelooking Doppler Profiler", Jun. 2008.
Stavros Vougioukas, Dimitris Papamichail, Pantazis Georgiou, Dimitris Papadimos, "Application note: River discharge monitoring using a vertically moving side-looking acoustic Doppler profiler".
Stephen Huddleston, Mark Zucker, Jeff Woods, Carrie Boudreau, Shane Ploos, and Christian Lopez, "Tools for Technicians; Lessons Learned in Index-Velocity Site Selection and ADVM Setup", May 2007.
URL:http://hydroacoustics.usgs.gov/indexvelocity/instruments. shtml, "Index-velocity and Other Fixed-deployment Instruments", Jan. 2013.
Aydogdu E., et al., "Nonlinear Equivalent Circuit Model for Circular CMUTs in Uncollapsed and Collapsed Mode." 2012 IEEE International Ultrasonics Symposium, IEEE, 2012.

* cited by examiner

ACQUATIC VELOCITY SCANNING APPARATUS AND METHODS

1. TECHNOLOGICAL FIELD

The present disclosure relates to underwater acoustics, and in certain exemplary aspects to acoustic transducers and acoustic Doppler systems (such as Acoustic Doppler Current Profilers, or ADCPs) applied to channel fluid flow velocity and channel discharge measurement.

2. DESCRIPTION OF THE RELATED TECHNOLOGY

An Acoustic Doppler Current Profilers (ADCP) is an exemplary type of sonar system that can be used to, inter alia, remotely measure channel flow velocity and/or channel discharge water velocity over varying horizontal and/or vertical ranges in fresh and salt water environments such as rivers, lakes, estuaries and ocean channels.

ADCPs are well established for measuring channel velocity distribution and discharge. They are pulsed sonars used to measure current velocities in a vertical or horizontal direction of water for each depth "cell" of water from the transducer face up to a maximum range. ADCP systems typically include a transducer and beamformer assembly which form multi-narrow beam which focus sound along multiple beam directions, a pulsed transmitter, to generate pulses of sound that backscatter as echoes from plankton, small particles, and small-scale inhomogeneities in the water and from the bottom surface. The transducer assembly is implemented with either multiple independent "piston" transducers inclined at different angles relative to the normal, or two-dimensional Phased Array transducers, which produce multiple inclined beams in two orthogonal axes. Also typically included in the ADCP is a receiver and signal processor which receives Doppler frequency shifted echoes and computes the relative velocity of the received sound versus time between the scatters ensonified by the transmitted pulse and the transducer along-beam direction. ADCP measurements from multiple beams are combined to remotely measure vertical or horizontal "profiles" of water velocities.

Currently, two types of ADCPs are most often employed in the foregoing channel flow/discharge measurement application. FIG. 1 illustrates one such type, which is a moving vessel (e.g., boat) 102 mounted with an ADCP "survey" system 100 which measures the vertical profile of horizontal currents along the path of the boat as it travels across the channel 110. Relative velocity of the measured horizontal "slice" or depth cell, is determined by subtracting out a measurement of vessel earth reference velocity, obtained by pinging the channel bottom or by a navigation system such as LORAN or GPS. These moving boat ADCPs are typically configured with a transducer assembly producing four diverging beams, spaced at 90 degree azimuth intervals around the electronics housing. A three beam system permits measurements of three velocity components, Vx, Vy, and Vz under the assumption that currents are uniform in the plane perpendicular to the transducers mutual axis. The primary advantage of this survey method is that a cross section 112 of the channel flow velocities 114 and channel depth may be remotely measured in a single boat transect across the channel.

However, this survey method also has several disadvantages, including inter alia:

1. because multiple boat trips across the channel at short time intervals are usually impractical, the measurement intervals are typically long (often several days), and channel flow may change significantly between surveys;
2. a boat equipped with the ADCP must travel across the channel, sometimes in high river traffic, poor light conditions, and rough surface conditions; and
3. due to practical limitations of accurately measuring the flow velocity near the surface and bottom, extrapolation algorithms must be used to estimate the flow velocity in these regions.

A second type of existing ADCP (FIG. 2) is an ADCP "monitor" system 200, typically with two piston transducers 210, physically mounted at a fixed location on the side of a fluid flow channel 200, and oriented with to produce substantially horizontal beams 225, one inclined at an angle on the order of 20 degrees upstream and the other pointing about 20 degrees downstream (as illustrated in FIG. 2). These systems transmit short pulses among the two beams, receive the backscattered echoes and measure the Doppler frequency shift versus time to compute fluid velocity profile components 220 along the direction of each fixed cross steam beam angle. The multiple beam velocity measurements are then combined to compute a horizontal downstream velocity profile 240 at a single cross-stream angle at a distance where valid data is received.

The primary advantages of this survey method are:
1. a single narrow beam portion of the channel flow measured by the upstream/downstream beams may be continuously measured, providing a means of continuously estimating the channel flow; and
2. the ADCP system may be permanently mounted in a fixed position on the side of the channel, out of the mainstream flow and where real time data is easily accessible. However, this second approach also suffers several salient disabilities, including:
1. the sample of the channel flow is derived from a horizontal velocity profile at a single depth, and usually measuring over only a small fraction of the total channel width (thereby not being representative of the broader channel behavior);
2. the fluid flow velocity measurements are limited in accuracy and horizontal range by sonar range and/or echo interference through transducer sidelobes and/or mainbeam spreading; and
3. the multiple piston transducer assembly currently used to form the beams protrudes out into the flow, and must be streamlined to prevent transducer face contamination or damage by channel debris.

Accordingly, improved methods and apparatus for performing, inter alia, channel or other aquatic acoustic measurements are needed.

SUMMARY

The foregoing needs are satisfied herein by providing, among other things, improved methods and apparatus for performing acoustic underwater measurements and evaluation.

In one aspect, the present disclosure describes a unique application of a scanned one dimensional transducer Acoustic Doppler Current Profiling (ADCP) sonar used to, in one application, continuously and remotely measure both vertical and horizontal profiles of river or channel along-stream water velocities within a cross-section of the river, from one or more side-mounted one-dimensional array transducers and associated beamformers.

In another aspect, a method is disclosed. In one embodiment, the method involves use of one or more one-dimensional array transducers and "phase delay" beamformers each array arranged in multiple substantially parallel X-axis rows of transducer elements, the rows spaced at e.g., approximately ½ wavelength at the carrier operating frequency and sound speed in the relevant fluid media. In one implementation, the transducer is physically mounted at a fixed location in the channel, viewing across fluid flow channel. A beamformer circuit is electrically connected to the elements in the X-axis rows of the array, applying fixed phase delayed signals associated, respectively between X-axis rows. The angle of the narrow beam in the Z-axis is determined by the beamformer phase shifts. Thus, the phase shifts may be sequentially changed to sequentially scan the beam in angular increments within a fan sector of e.g., up to +/−50 degrees in the Z-axis. Multiple beams may be simultaneously formed within this sector by using multiple phase shift beamformers operating in parallel.

One salient advantage of this multiple beamforming technique relative to single beam angle piston transducers currently used for fixed position channel flow measurement applications is that the inventive array transducer disclosed herein is capable of simultaneously or sequentially forming multiple narrow beams projected across the channel in the Z-axis within a fan shaped sector of up +/−50 degrees. The phase delay beamforming method is relatively simple to implement, but limits the array bandwidth for generating narrow beams to about 6% of the carrier frequency. If broader bandwidth signals are used, the beamwidth will be increased.

In another implementation, in the above described one-dimensional array transducer(s) is a "time delay" array transducer arrangement where the beamformer applies time-delayed signals associated, respectively with each X-axis row, sequentially and/or simultaneously forming one or more sets of Z-axis transmit and/or receive beam sets projected outside of the X, Y, Z axes array plane.

In another embodiment, the method includes applying the above described transducers and beamformers in an ADCP to remotely and continuously measure both vertical and horizontal profiles of channel along-stream water velocities within a cross-section of the body of water (e.g., river) from a single side-mounted transducer In one implementation, this system utilizes one or more one-dimensional multiple time delay beamformers multiple narrow beams within one or more a fan sectors (e.g., 2) oriented inclined at an angle on the order of 20 degrees upstream and the other pointing downstream. This exemplary embodiment of the time delay array beamforming method is more complex to implement, but enables the array to generate narrow beams with signal bandwidths up to a large percentage (e.g., 60%) of the carrier frequency.

In one variant, the systems sequentially transmit short pulses along each of the narrow beams in a fan beam sector, and sequentially receive and measure the Doppler frequency shift versus time in multiple "range bins" to compute multiple fluid velocity profile components along the direction of each fixed beam angle. Array transducers are coupled to transmit and receive time delay beamformers to form multiple narrow beams within the fan shaped angular sector. Doppler frequency based velocity profile measurements in multiple range bins are combined to compute a cross section of the channel flow velocity within the angular sector of the fan beams, and at a maximum horizontal distance across the channel determined by the range capability of the sonar and limitations imposed by measurement accuracy limitations due to transducer sidelobe and main beam spreading across the channel. The ADCP operates by transmitting N narrow pulse acoustic signals on each of the plurality of beams within the fan beam sector, receiving echoes from each transmit/receive cycle "ping", obtaining Doppler frequency based velocity estimate for each range bin of the N pings from echoes from the water mass, and calculating an average velocity profile based on the sum of the N velocity estimates along each beam angle.

In another aspect, an ADCP system is disclosed. In one embodiment, the system includes an array transducer and phase delay beamformers to form multiple beams, where the transmitted signal is a single tone pulse with a prescribed bandwidth (e.g., less than 6% of the carrier frequency). The Doppler Frequency of the echo is computed using a auto-correlation method at a time delay which is a fraction of the transmitted pulse width (so-called "pulse incoherent" Doppler signal processing).

In another embodiment, the ADCP system comprises an array transducer and multiple beam phase delay beamformers, where the pulsed transmit signal is a dual phase or frequency coded pulse with a prescribed bandwidth. The Doppler Frequency along each beam is computed using an auto-correlation method at a time delay approximately equal to the dual pulse lag (so-called "dual-pulse coherent or broadband" Doppler signal processing).

In yet another embodiment, the ADCP system comprises an array transducer and multiple beam phase delay beamformers, where the pulsed transmit signal is either a single tone or dual phase or frequency coded pulse with a pre-scribed bandwidth, and the Doppler Frequency of the echo is computed using an auto-correlation method at a time delay equal to the time lag between successive pulse transmissions (so-called "pulse-to-pulse coherent" Doppler signal processing).

In a further embodiment, the ADCP system comprises an array transducer and multiple phase delay beamformers, where the transmitted signal is a single tone pulse (e.g., with a bandwidth up to 60% of the carrier frequency). The Doppler Frequency of the echo is computed using a pulse incoherent Doppler signal processing technique.

In another embodiment, the ADCP system comprises an array transducer and multiple time delay beamformers, where the pulsed transmit signal is a dual phase or frequency coded pulse with a bandwidth (e.g., up to 60% of the carrier frequency), and the Doppler Frequency is computed using a dual-pulse coherent or broadband Doppler signal processing technique.

In yet another embodiment, the ADCP system comprises an array transducer and multiple time delay beamformers, where the pulsed transmit signal is either a single tone or dual phase or frequency coded pulse with a bandwidth (e.g., up to 60% of the carrier frequency), and the Doppler Frequency is computed using e.g., pulse-to-pulse coherent Doppler signal processing.

In a further embodiment, the ADCP system comprises an array transducer and a time or phase delay beamformer method, where multiple ping along-beam measurements are made at the same inclination angle, and the multiple ping echoes are pre-processed to suppress the bottom portion of the composite bottom/fluid echoes prior to computing the near bottom fluid velocity to substantially remove the fluid flow velocity measurement error caused by bottom echo interference for near bottom slant beam measurements.

In another aspect, a computer-readable apparatus is disclosed. In one embodiment, the apparatus includes a storage device with at least one computer program disposed thereon, and operative to, when executed on a processing device, implement a time or phase delay beamformer.

Other features and advantages disclosed herein will immediately be recognized by persons of ordinary skill in the art with reference to the attached drawings and detailed description of exemplary embodiments as given below.

DETAILED DESCRIPTION OF CERTAIN EMBODIMENTS

Various aspects and features of the disclosure will become more fully apparent from the following description and appended claims taken in conjunction with the foregoing drawings. In the following description, specific details are given to provide a thorough understanding of the disclosed methods and apparatus. However, it will be understood by one of ordinary skill in the technology that the disclosed systems and methods may be practiced without these specific details. For example, certain components may be shown in block diagrams in order not to obscure certain aspects in unnecessary detail. In other instances, such components, other structures and techniques may be shown in detail to further explain certain aspects.

It is also noted that certain aspects may be described as a process, which is depicted as a flowchart, a flow diagram, a structure diagram, or a block diagram. Although a flowchart may describe the operations as a sequential process, many of the operations may be performed in parallel or concurrently and the process may be repeated, or the steps thereof permuted. In addition, the order of the operations may be re-arranged. A process is terminated when its operations are completed. A process may correspond to a method, a function, a procedure, a subroutine, a subprogram, etc. When a process corresponds to a function, its termination generally corresponds to a return of the function to the calling function or the main function.

While the description herein is provided generally for the case of one dimensional multibeam scanning transducer arrays and channel flow monitoring ADCP, other velocity measurement systems, such as measuring the horizontal flow from a fixed position platform, may share the same general characteristics, and the disclosure may be equally applicable thereto. Various embodiments of a one dimensional multibeam transducer array and channel flow monitoring ADCP utilizing the exemplary array transducer method as described below may be applied to other applications or use cases, such as both these other horizontal flow measurement applications.

Exemplary One-dimensional Multiple Beam Transducers

Figure 3:
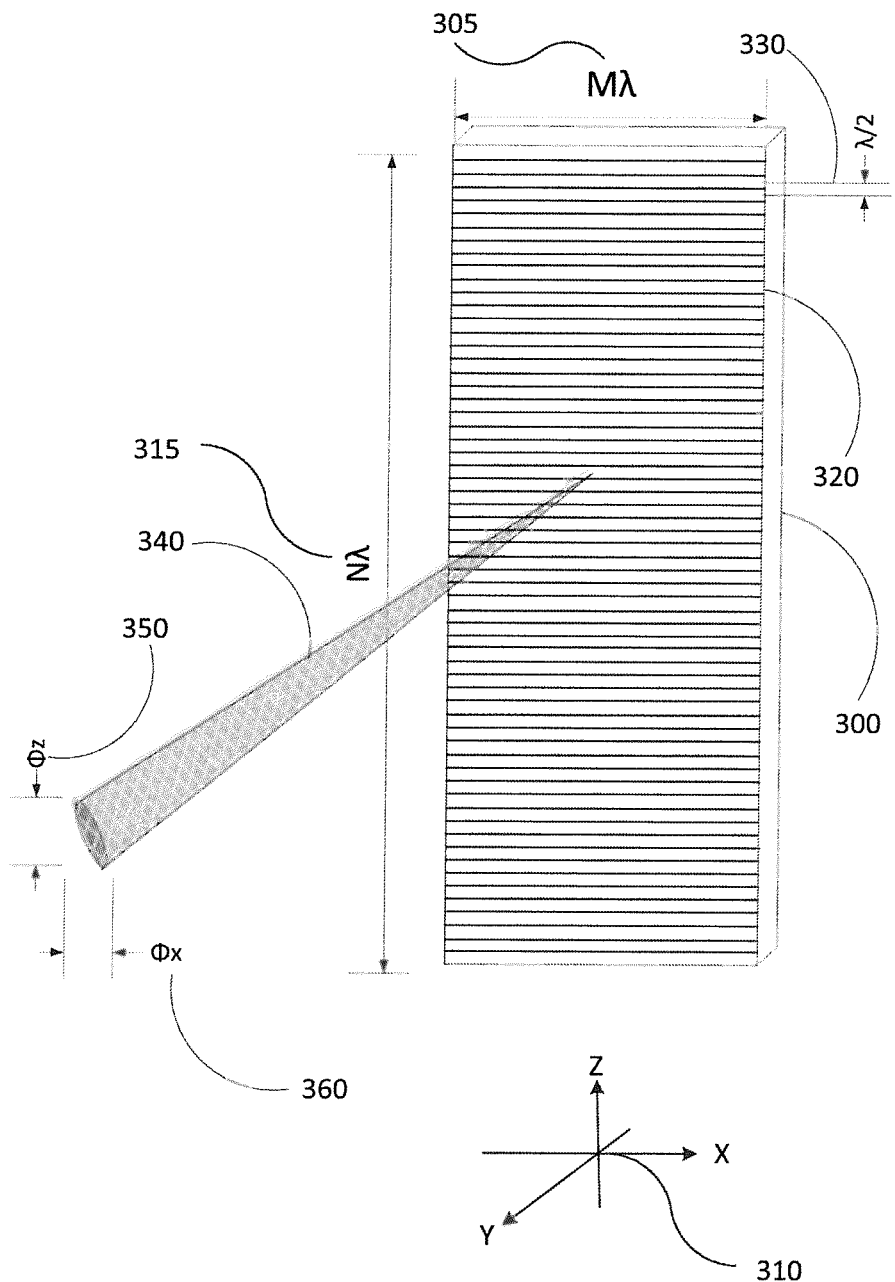
FIG. 3 illustrates one embodiment of the physical configuration of an exemplary scanning array transducer according to the disclosure, configured for application in an ADCP for channel flow monitoring.

One embodiment of a one-dimensional array transducer 300 is illustrated in FIG. 3. The coordinate system 310 used for the purposes of this embodiment description is as shown, with the rows oriented in the X-axis, along the vertical Z-axis, although this coordinate system is merely arbitrary and may be replaced with another. The faces of the exemplary array are rectangular, but other form factors such as ellipses or polygons which generally have one longer major Z suitable for forming narrow inclined beams of general conical form inclined in the Y-axis may be used with equal success.

The illustrated array consists of multiple rectangular shaped transducer elements 320 each arranged in multiple substantially parallel X-axis rows transducer elements, the rows spaced at approximately ½ wavelength 330 at the sound speed in the fluid media. The array row elements may be, in one implementation, continuous strips of piezoelectric ceramic, or segmented shorter elements. The array beamwidth in the X and Z-axis is determined by the length 315 and width 305 in units of wavelengths at the carrier frequency and sound speed in the fluid media. For a rectangular array, the approximate beamwidth in degrees ($\Phi_X$) 360, in the X and ($\Phi_Z$) 350 in the Z plane is given by:

$\Phi_X$=50/M, where M is the width of the array in wavelengths, and $\Phi_Z$=50/N, where N is the length of the array in wavelength.

Figure 1:
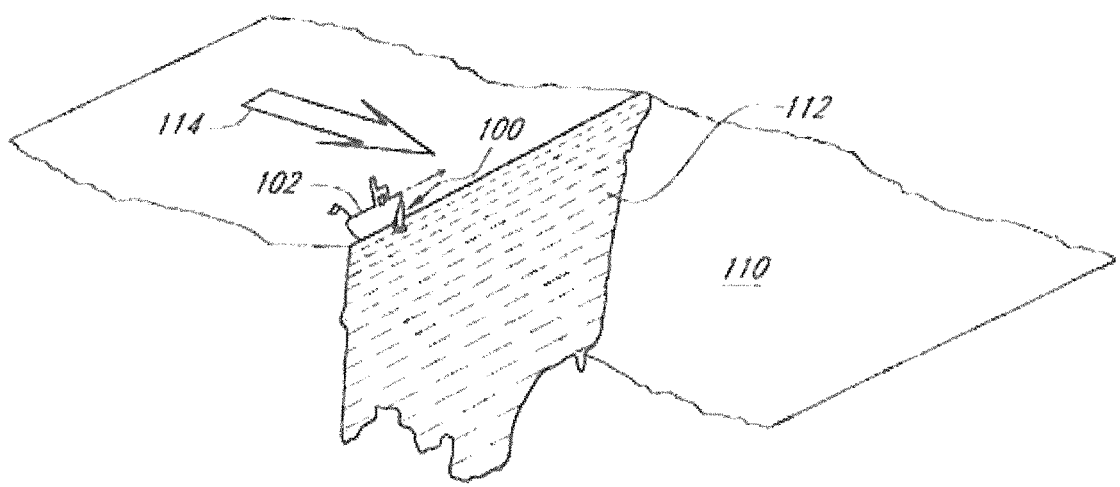
FIG. 1 illustrates a typical prior art moving boat mounted ADCP survey system which measures a velocity cross section in the channel, by measuring the vertical profile of horizontal currents along the path of small boat as it travels across the channel.
Figure 2:
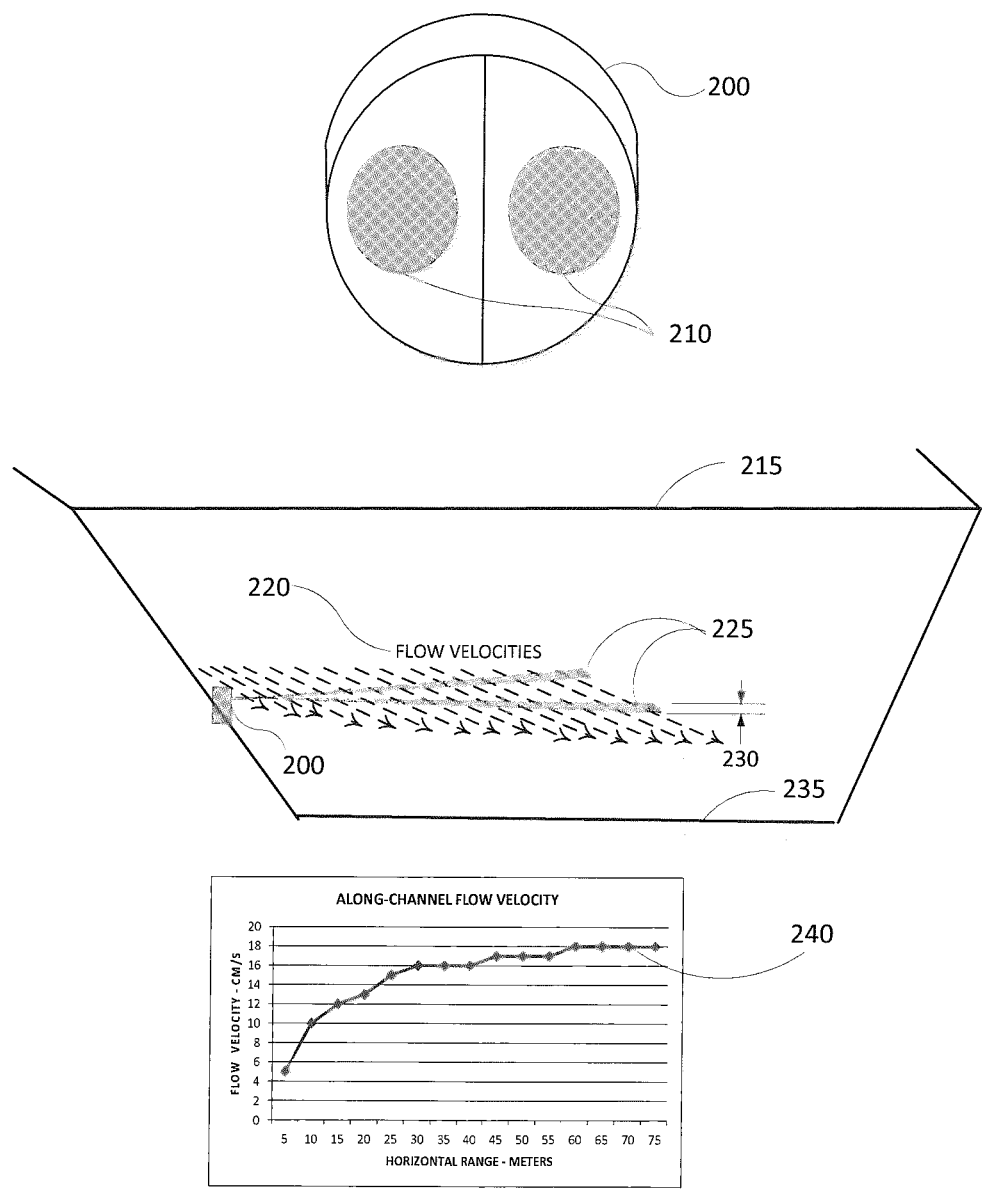
FIG. 2 illustrates a typical prior art ADCP channel flow monitor system with multiple piston transducers physically mounted at a fixed location in a fluid flow channel, and oriented with two or more substantially horizontal beams, one inclined at an angle upstream and the other pointing about s downstream, measuring horizontal profile of channel flow velocities components along the direction of each of the inclined beams, producing horizontal profile of channel flow velocities a single fixed vertical beam angle.

For typical channel monitoring applications, the prior art transducers used in channel horizontal monitoring are circular disc transducers 180 illustrated in FIG. 2. The transducers have a minimum beamwidth 230 of approximately three (3) degrees in the X and Y-axis normal to the disc transducers. The minimum beamwidth is generally limited by the maximum transducer disc or solid rectangular size which can be practically fabricated. At carrier frequencies typically used in horizontal channel monitoring systems, this limits beamwidth to a value on the order of 3 degrees.

Multiple element array transducers fabricated from multiple small transducer elements, as described above for use in this application, are advantageously not subject to this limitation, since small elements are readily commercially available. The beamwidth in the X-axis which is in the direction of channel flow is not as critical, since there are normally no highly reflective objects or boundaries in this direction. Thus, a beamwidth of 3 or more degrees is usually sufficient, requiring an array Y-axis diameter of approximately 16 wavelengths in the exemplary implementation.

However, the Z-axis beamwidth in the vertical plane is typically much more critical, due to the presence of the highly reflective clutter surface and bottom in this axis, when the desired echo at any given range across the channel is from the fluid media, which normally has a lower reflection coefficient. Typical limitations on the height of the transducer array are practical transducer length for ease of installation, and cost of the materials and fabrication of the transducer array and associated electronics beamformers. Fortunately, the cost of transducer materials has been recently reduced at least partially due to the increase in number and expansion of offshore transducer material manufacturers. Also, the fabrication cost is under the control of the transducer array manufacturer and have been and continue to be reduced primarily due to automation of the manufacturing processes. The cost of multiple transmitter and receiver electronics is also being reduced by technology and process improvements of commercial electronics component manufacturers.

Generally, from a performance viewpoint, the narrowest Z-axis beamwidth practically achievable in terms of size, weight and cost are best. Considering the state of the art in array transducer material and manufacturing costs of an array of equivalent size of piston transducers currently used for horizontal channel monitoring, an equivalent size array is competitive with a piston transducer. However, the angular scanning capability of array transducers greatly improves the flow monitoring performance. This is one primary advantage of the method disclosed herein. From a practical viewpoint, the performance/cost ratio is very favorable relative to conventional piston transducers. Also, the array transducer can be practically fabricated longer in length, and thus is capable of much narrower Z-axis beamwidths, which is a second advantage of array transducers over conventional piston transducers. Thus, it is now much more practical to produce commercial multibeam sonars, which the exemplary embodiment herein leverages.

Figure 4:
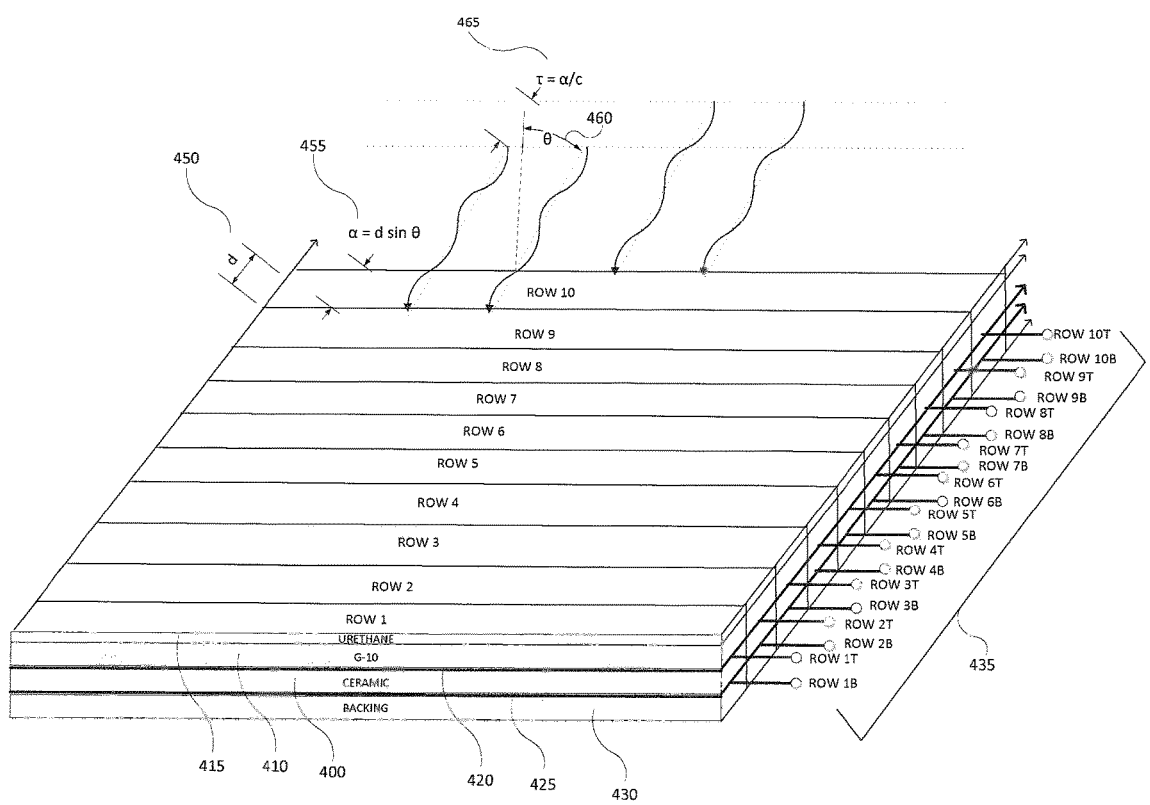
FIG. 4 illustrates the configuration of a section of one exemplary embodiment of a multi-layer broadband transducer array according to the disclosure, as well as a diagram of exemplary wave front arrival time differences between adjacent line elements in the transducer array.

To achieve broadband transducer operation, as is often required for ADCP applications which use broadband system operation, an acoustic quarter-wave transformer is used in front of the ceramic array in this embodiment to improve the acoustic coupling between the array and water, and to significantly increase the transducer bandwidth. FIG. 4 illustrates one embodiment the multilayer construction of a broadband array transducer according to the disclosure. The row sliced transducer array ceramics 400 in this embodiment are mechanically connected by two pieces of thin acoustically transparent flexible printed circuits (FPC) on the top 420 and bottom 425 surfaces of the ceramics. FPC's are fabricated with e.g., a thin Kapton or other suitable material. Electrical connection to the front and backside of each X-axis rows of ceramic elements is achieved in this embodiment by fitting and conductively adhesive-bonding the printed electrical conductor lines across each row to the front and backside of the conductive ceramic surfaces of the X-axis rows. Several alternate methods of bonding or electrical connections to the rows may also be suitable. The FPC frontside row connection pattern is along array rows, with each row independently routed to a rectangular area 435 along the array side with FPC suitable for electrical connecting to the array. The backside rows may alternatively be electrically connected in individual rows, or connected together to form a common plane for the array rows. Various other approaches will be recognized by those of ordinary skill given the present disclosure.

Pieces of acoustic quarter-wave transformers are used on the front side to improve the impedance matching and acoustic coupling between the high acoustic impedance array ceramics and low acoustic impedance water. Matching materials with suitable acoustic impedance such as e.g., G-10 fiberglass material 410, with face dimensions matching the array rows are bonded to the front of the top flexible circuit on the transducer array. This fiberglass (G-10 or equivalent, or yet other suitable material) significantly increases the coupling and transducer element bandwidth. In certain embodiments, the significant increase in the transducer bandwidth is desired for broadband ADCP applications. A layer of urethane 415 is bonded to the front of the fiberglass piece, to inter alia seal the sliced array from the water, and to further improve the impedance matching and acoustic coupling between the array and the water.

Multiple sliced rows of alternating low and high acoustic impedance, quarter-wave thick layers 430 are bonded to the back side FPC placed to the back of the bottom flexible circuit to, in the illustrated embodiment, reflect the acoustic energy transmitted backward, and to provide the necessary mechanical support against the water pressure incident on the front of the transducer array surface. It is appreciated by those of ordinary skill given this disclosure that other front and back matching layers may be used depending on the particular application.

As illustrated in FIG. 4, during receipt of a tone burst acoustic signal at a single frequency (narrowband), f, with wavelength, $$\lambda = c/f,$$

where c is the sound propagation velocity in the fluid media, incoming sound ray wave fronts 440 traveling in the X, Y direction and at an angle ($\theta$) 460 with the Y-axis, where Y is normal to the array plane. Different travel distances to each of the X-axis row line-arrays exist, and thus strike each of the line arrays at different times The path length differences ($\alpha$) 455 between adjacent line-arrays are related to the element center-to-center separation distance (d) 450 by:

$$\alpha = d\sin\theta$$

The wave front arrival time differences (τ) 465 between adjacent line-arrays is:

$$\tau = \alpha/c = (d/c)\sin\theta$$

Where θ is the arrival angle.

The elements are spaced in one implementation at distances 450 corresponding to a half-wavelength of the arriving narrowband signal (d=λ/2), the path length difference expressed in terms of arriving signal wavelengths is given by:

$$\alpha = (\lambda/2)\sin\theta$$

For a vertical axis arrival angle of, for example, 30 degrees:

$$\alpha = (\lambda/2)\sin 30° = \lambda/4$$

For both transmit and receive beam scanning operation, each of the X rows 435 is electrically connected to a beamformer which provides fixed time delays between adjacent line-arrays for each scanned angle. These time delays compensate for those arising from the different inter-element path lengths (.tau.) of the acoustic pulse incident on the line arrays. The resulting time-delayed signals will be in phase and, when summed, and will form a maximum acoustic interference pattern when transmitting or receiving a wave front leaving or arriving at specific incidence angles determined by the beamformer time delay.

Channel Monitor Transducer and Beamformer

Figure 5:
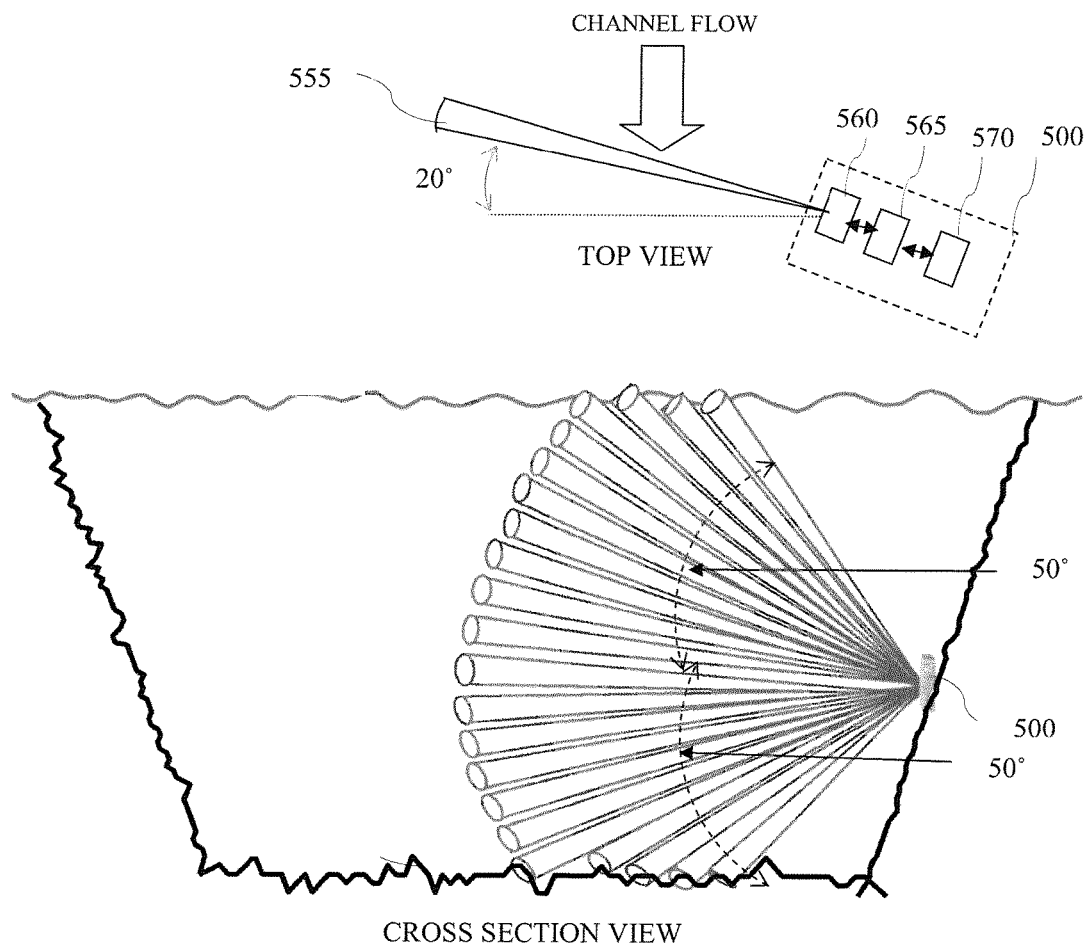
FIG. 5 illustrates one embodiment of a single array transducer and beamformer assembly configured for application in an exemplary ADCP channel flow monitoring system; i.e., physically mounted at a fixed location in the channel with the face of the array transducer pointed across fluid flow channel and inclined in the X stream flow plane, forming and sequentially scanning beams in the Z-axis of each transducer array within a fan shaped sector.

One exemplary embodiment using a scanned transducer array for channel flow and discharge measurement is illustrated in FIG. 5. Based on the foregoing considerations, a reasonable commercially viable array transducer embodiment for channel monitoring comprises N=16 wavelengths wide, and on the order of N=48 wavelengths long, and provides a beam 3 degrees wide and about 1 degree in the long dimension. When this narrow beam is scanned over the Z-axis fan area of +/−50 degrees relative to vertical, one-hundred (100) one-degree beams are formed in the vertical plane.

The exemplary system of FIG. 5 utilizes a single array and transmit/receive beamformers to remotely acoustically scan a channel cross-section from a single side-mounted transducer and beamformer assembly 500. The array transducer and beamformer views across the fluid flow channel, with the array 560 inclined 20 degrees in the X stream flow plane. The illustrated embodiment of the system operates by sequentially transmitting acoustic signals "pings" on each of the plurality of beams within the fan beam sector, and receiving echoes from each ping. The transmit and receive cycle for one beam is commonly referred to as a "ping" cycle. A transmit/receive beamformer circuit 570 is electrically connected to the each of the elements through Transmit/Receive (T/R) switches 565, applying fixed time or phase delayed signals associated respectively between X-axis rows for each ping cycle. Beam Z-axis scanning is accomplished in the illustrated embodiment by applying different time or phase delays to sequentially scan the beam in angular increments within a fan shaped sector of +/−50 degrees in the Z-axis. Multiple beams also may be simultaneously formed within this sector by applying multiple beamformers operating in parallel.

The T/R switches allow the full array to be used to sequentially form narrow beams in both transmit and receive mode of operation. Thus, the resulting 2-way array beams are the product of the transmit and receive beams, and provide the narrowest 2-way beams and lowest sidelobes achievable with this array. This narrow 2-way beamwidth is advantageous for use in embodiments of ADCP channel flow monitors, in order to minimize clutter interference from the bottom and/or surface at longer ranges.

A salient advantage of this multiple beamforming embodiment, relative to single beam angle piston transducers currently used as part of ADCP for fixed position channel flow measurement applications, is that the array transducer is capable of simultaneously or sequentially measuring channel at multiple narrow beams projected across the channel in the Z-axis scanned over a fan shaped sector of e.g., +/−50 degrees. A phased array beamformer is relatively simple to implement, but since the beam angle will be frequency dependent and, if the incoming or outgoing wave has a broad spectrum, the mainlobe beam pattern will be correspondingly broadened in angular space. This typically limits the phased array bandwidth for generating narrow beams to a bandwidth of about 6% of the carrier frequency. If broader bandwidth signals, (which provide improved along-beam velocity measurement precision) are used, the bandwidth will be increased to a value on the order of 50% of the carrier frequency.

Figure 6:
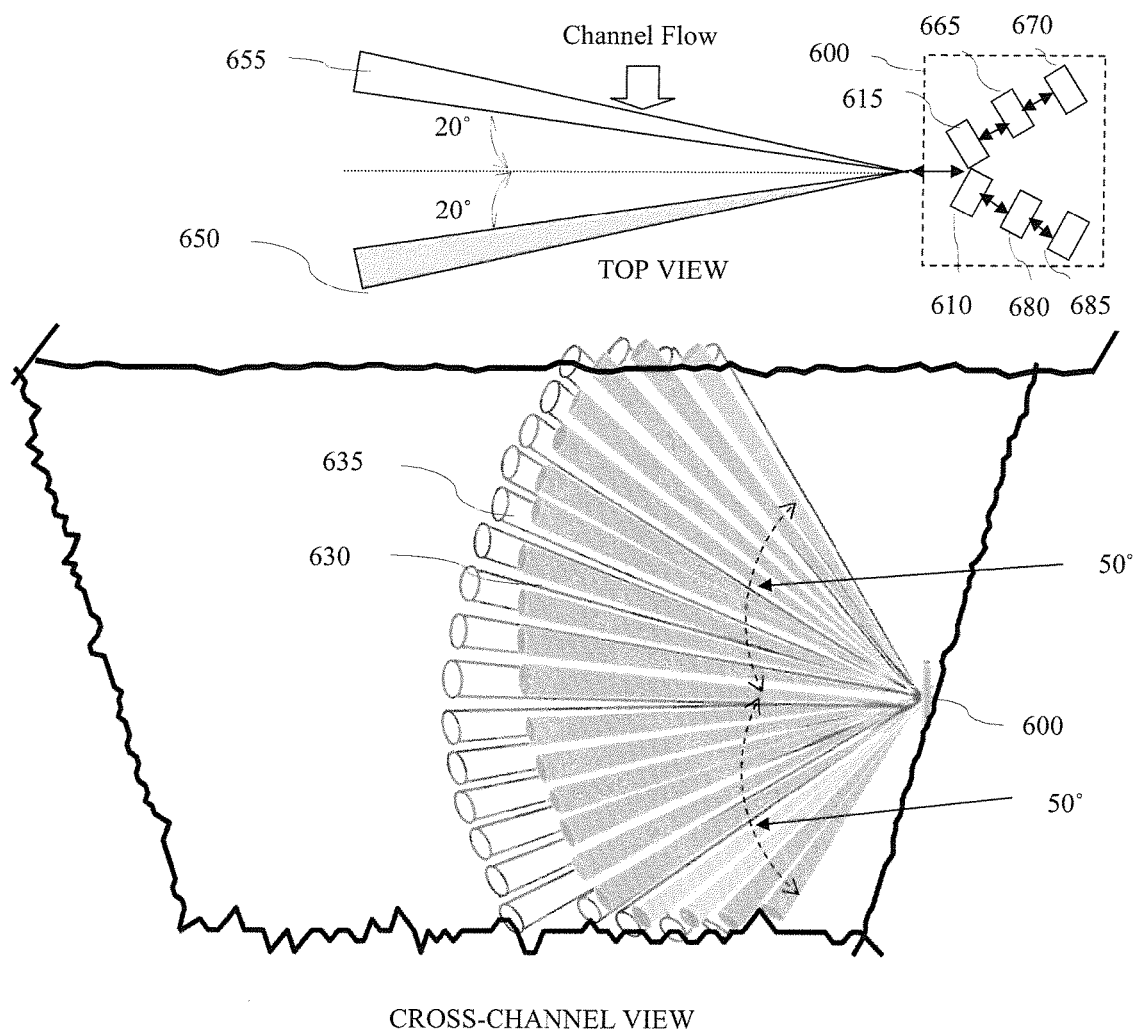
FIG. 6 illustrates one embodiment of a dual array transducer and beamformer assembly configured for application in an exemplary ADCP channel flow monitoring system; i.e., physically mounted at a fixed location in the channel with the face of each array transducer pointed across fluid flow channel and inclined upstream and downstream in the X stream flow plane, forming and sequentially scanning beams in the Z-axis of each transducer array within a fan shaped sector.

Another exemplary embodiment uses a dual scanned transducer array for channel flow and discharge measurement, as illustrated in FIG. 6. In this embodiment, two identical planar acoustic transducer arrays 610 and 615 are oriented +/−20 degrees in the Y-axis. A salient advantage of using dual transducers for ADCP measurement of the flow velocity relates to the significant reduction of the velocity accuracy sensitivity to beam angle alignment to the flow velocity. Each of the dual transducers, beamformers 670 and 685, and T/R switches 665 and 680 operate sequentially, but each individually operates the same as the single transducer systems.

Doppler Frequency Measurement Techniques

There are three Doppler measurement techniques commonly used in different applications of a channel flow monitoring ADCP (either continuously or sequence intermixed thorough out the deployment time). These are:

1) pulse-incoherent (narrowband),
2) pulse-coherent (broadband) including a broadband method which uses coded-pulses, and
3) pulse-to-pulse coherent.

These techniques are selected based various parameters, including channel geometry, flow characteristics, and flow measurement requirements. These techniques are thoroughly described in publically available documents, including the references cited in Exhibit A hereto, which are each incorporated by reference herein in its entirety. A skilled technologist will thus understand and appreciate that there are trade-offs for the broadband method in, for example, choosing the proper code, code length and/or pulse separation of a multi-pulse waveform that will depend on the particular application. A mixture of two or more of the three methods may also be used in a typical deployment. This mixture allows utilizing the advantages of each technique in order to compute the total channel flow horizontal and vertical cross section channel flow profile.

An Exemplary ADCP Using Dual Time Delay Arrays Transducer

When coupled with an exemplary ADCP (such as e.g., that described in following paragraphs), the scanned array of the disclosure advantageously provides a factor of 100× more useful fluid flow information, relative to prior art "horizontal looking" flow monitors, thereby enabling inter alia a more accurate characterization of the vertical and horizontal distribution of currents, and more accurate computation of the channel discharge versus time. The flow data from the total scan sector enables computing a velocity flow cross-section, which currently can only be accomplished with a moving boat channel survey system, which has salient disadvantages as described supra.

Figure 7:
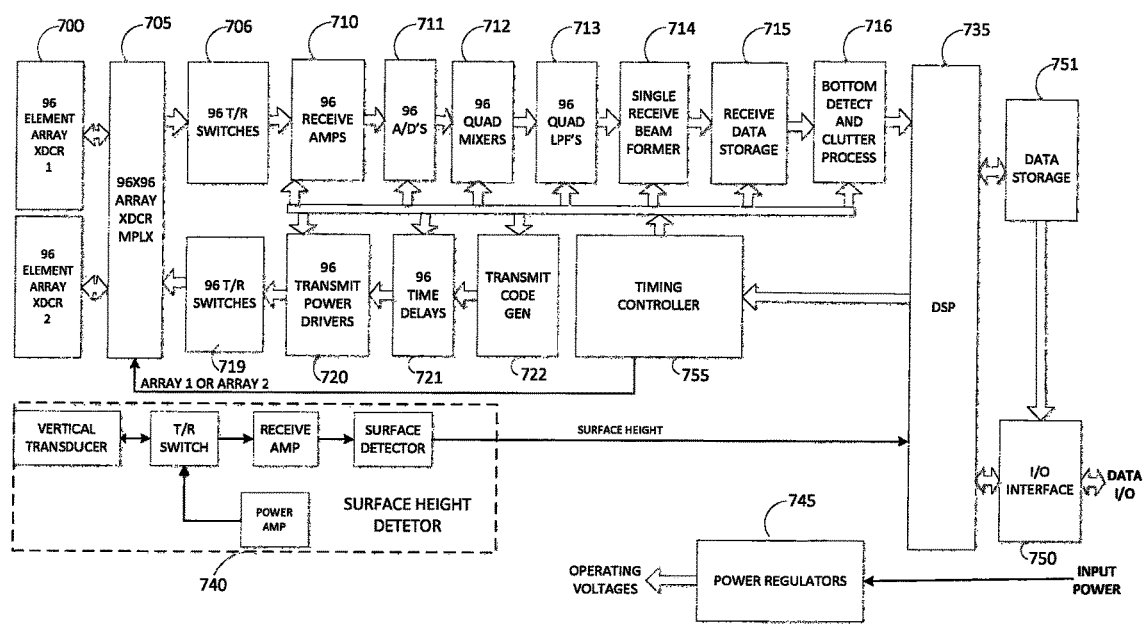
FIG. 7 is a functional block diagram illustrating one embodiment of an ADCP channel flow monitor system according to the disclosure, configured with dual transducers and beamformers to remotely and continuously measure both vertical and horizontal profiles of channel along-stream water velocities within a cross-section of the river from a single side-mounted transducer assembly.

FIG. 7 is a detailed functional block diagram illustrating one embodiment of an ADCP including two one-dimensional transducer arrays 700. In this embodiment, the arrays are oriented +/−20 degrees in the X-axis as described in FIG. 6. The exemplary system can be generally functionally partitioned as shown into the following (although it will be appreciated that more or less components/modules, and different configurations thereof, may be used consistent with the disclosure):

1. A dual front-end transducer assembly 700 that couples the transmitted acoustic signals to the water, and receives backscattered acoustic echoes from the water.
2. A set of transmit/receive multiplexers 705.
3. A set of T/R switches for both transmit 719 and receive operation 706.
4. A receive amplifier set of electronics modules 710.
5. A set of A/D converters 711.
6. A set if quadrature mixers 712.
7. A set of low pass filters 713.
8. A receive beamformer 714.
9. A receive beam storage module 715.
10. A bottom detector and clutter processor 715.
11. A transmit diver set of electronics modules 720.
12. A transmit time delay network 721.
13. A transmit code generator 722.
14. A system timing controller electronics assembly 730 that coordinates transmit, receive and beamforming operation.
15. A processor or Digital Signal Processing (DSP) electronics module 735 that performs signal processing.
16. A vertical surface detection module 740.
17. A system power supply 745.
18. An output data storage module 751.
19. An Input/Output (I/O) signal module 750.

This exemplary channel flow monitoring ADCP embodiment operates at carrier frequency of 300 kHz. Each transducer array is 16 wavelengths wide and 48 wavelengths long, thereby providing beams of about three (3) degrees in the X plane, and one (1) degree in the Z-axis. X-axis rows are spaced at ½ wavelength, resulting in 96 row elements in each array. At a 300 kHz, operating frequency, $\lambda$=0.5 cm, and each array has outside dimensions of 8 cm wide by 24 cm long. The system operates "ping" cycles by transmitting short pulses about 1.4 ms long, corresponding to about a one (1) meter 2-way range along a beam from one of the two arrays, During the receive part of the ping cycle, the inter-element received backscattered echoes are delayed by the same time delays as applied to the inter-element transmit signals, to form a receive beam corresponding to the transmit beam. The receive time interval is segmented into a series of short time intervals, each approximately equal to the transmit pulse time, forming a sequence of 1 meter long "range bins" of the received signal. For a 100 m echo receive range, the total receive duration is about 70 ms, and has 100 range bins.

During transmit mode, the timing controller 755 controls:
1) setting the transmit T/R switch 719 in the transmit mode;
2) connecting each of the array X-axis element rows of one of the two transducer arrays 700 through the 96 ×2 multiplexer 705 to 96 T/R switches 706, to 96 transmit amplifiers 720;
3) setting the transmit pulse duration in the transmit code generator 722 to set ensonified bin length and pulse coding along the beam, and
4) setting the inter-amplifier time delays 721 to determine the Z-axis inclination of the transmitted beam.

Each transmit amplifier supplies the maximum practical electrical drive power, usually limited by acoustic shock formation, to each of the array rows. The magnitudes of these row drives may be varied across the Z-axis, e.g., to shade the beam formation so as to further lower transmit beam sidelobes.

Immediately following the end of the transmitted pulse, the timing controller 755 selects and controls the receive mode by:
1) setting the receive T/R switch 706 in the receive the mode;
2) setting the receive bin intervals in the receive beamformer 714;
3) setting the fixed receive inter-channel time delays in receive beamformer 714 to correspond to the transmit delays;
4) setting the ping-to-ping echo storage in the clutter and bottom detection module 716; and
5) controlling transfer the received signal data to the DSP 735 for further processing.

The received signals associated with the 96 receive channels are amplified to levels adequate for digitizing by 96 gain controlled receive amplifiers 710, and then digitized in A/D converters 711. The digitized output signals are applied to 96 sets of in-phase and quadrature mixers 712, which heterodyne the received signal to translate the 300 kHz carrier signal into a baseband (zero carrier frequency) quadrature signals. The baseband digital signals consist of in-phase [cosine] and quadrature [sine] signal, collectively called complex quadrature signals.

The processor 735 of the illustrated embodiment be a digital signal processor (DSP), or any other suitable signal processing circuit such as microcontroller and/or a programmable gate array (e.g., FPGA), RISC or CISC core, RCF (reprogrammable compute fabric), etc. In some embodiments, the processor may be configured to execute one or more software processes. A user specifiable set of operating parameters, including the number of beams formed and signal processing techniques which are stored in digital memory. The exemplary illustrated DSP controls ADCP operation in part based on the stored user- or application-specific parameters, the specific stored parameters used in ADCP operation. The received signal strength signal can also be used in measuring backscatter strength, particle concentration, surface height and/or bottom depth.

The baseband quadrature signals are applied to filters, e.g., digital programmable low-pass filters 713. The low-pass filters are programmed to pass the lower sideband frequencies of the mixing process; e.g., up to 50% of the carrier frequency, corresponding to the bandwidth of the transmitted pulse and the maximum Doppler frequency shift. The digital filtered quadrature signals outputs from the low-pass filters are applied to a time delay beamformers 714, forming a single receive beam for each ping cycle.

The DSP computes the complex autocorrelation of the quadrature signals to compute the Doppler frequency of the beamformed signals, at each "range bin" at a time lag (t) set, dependent upon the ADCP mode of operation (e.g. pulse-incoherent (narrowband), pulse-coherent (broadband), and/or pulse-to-pulse coherent modes). The output of the complex autocorrelation computation is a complex number (X).

The Doppler frequency ($F_d$) is the computed as:

$$F_d = \arctan(X/2\pi hT)$$

where:
- $F_d$ is the Doppler frequency of the echo
- X is the complex number;
- h is the lag used to calculate the autocorrelation; and
- T is the time between samples.

The horizontal velocity along the upstream and downstream beams $V_{b1}$ and $V_{b2}$ is computed as at each range bin from the measured Doppler frequency $F_d$ in the bin time interval and wavelength of transmit carrier frequency ($\lambda$) as:

$$V_b = 0.5\lambda F_d$$

Thus, time- and space-segmented velocity measurements are created along the beam directions, which is collectively referred to as a velocity profile.

Figure 9:
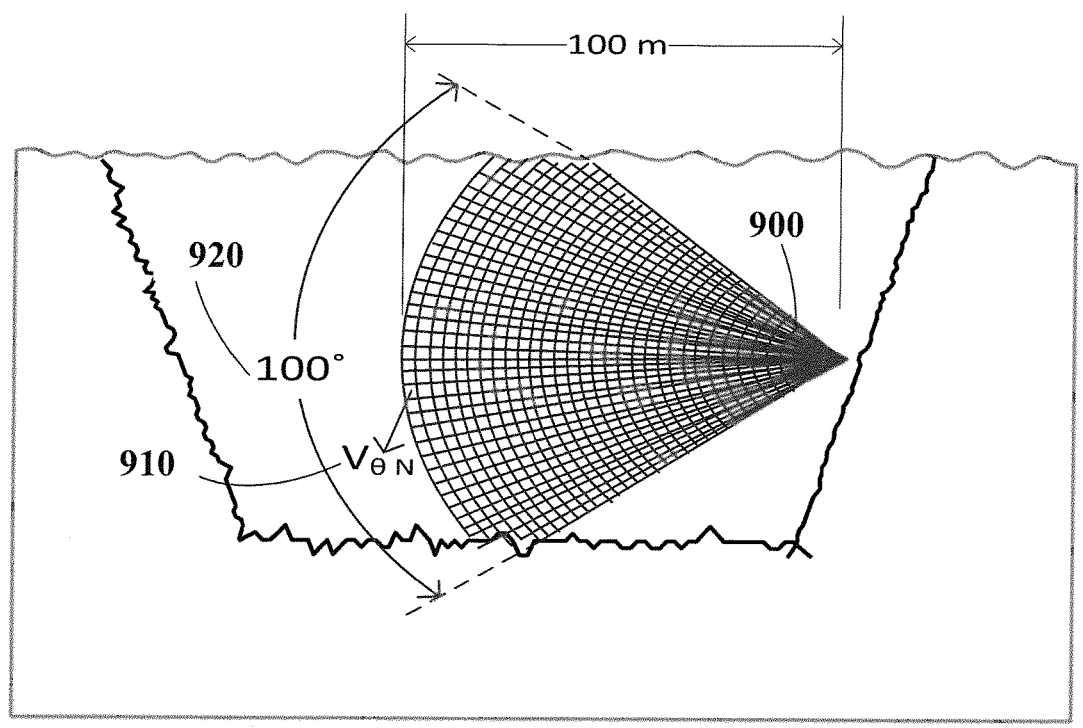
FIG. 9 is a graphical representation illustrating an example cross section of flow velocities measured with an ADCP with a scanning transducer channel flow monitor system according to one embodiment of the disclosure.

The transmit, receive, time delay beamforming, Doppler frequency calculation, and horizontal velocity calculation is in the illustrated embodiment sequentially repeated; i.e., at transmit and receive time delays required to scan the vertical beam inclination throughout the fan beam sector. The multiple narrow beam velocity profile measurements are then combined to compute a cross-section of the channel flow velocity bins within the angular fan shaped sector formed by the scanned beams, and at a horizontal distance across the channel of about 100 meters for an exemplary 300 kHz sonar, as illustrated in FIG. 9. In the region within the sector where boundary interference through the mainlobe, and main beam spreading across the channel, or sidelobe reflection interference, limit the maximum range for accurate velocity determination near the boundaries, this data is discarded. For each velocity bin, the horizontal profiling range resolution is primarily determined by the transmit pulse width, and the height is determined by the spreading beams. Thus, the bin width and height increase with horizontal range, as illustrated in FIG. 9.

If bottom echo interference is present in one or more range cells of the composite echo from the water and the bottom (particularly when beam angle are inclined downward, for that range cell), the center of the echo spectrum of the Doppler shifted received signal and the resulting calculated water velocity will be biased towards zero, since the bottom is not moving relative to the fixedly mounted transducer. Two exemplary clutter methods may be used to eliminate or minimize this bias.

In the case where the bottom particle distribution is not significantly changed between consecutive pings, at a fixed vertical beam inclination, the bottom portion of the echo will be nearly identical for each of the pings (highly correlated), and the water portion of the echo will be uncorrelated (due to turbulence in the flowing water changing the scattering partial distribution during the inter ping interval). Thus, a ping pair may be processed 716 prior to computing the autocorrelation function and Doppler frequency shift, in order to suppress the coherent portion of the echo. A simplified two-ping processing technique comprises subtraction of the received echoes to suppress the identical coherent bottom reflection portion of the echo, while combining the ping-to-ping random water reflection portion of the echo.

In the case where the bottom clutter is coupling through sidelobes (or the main beam) for a range bin, the mean Doppler frequency from the bottom will be zero, and the mean Doppler frequency from the water will be higher, proportional to the water velocity. Thus, if the frequency spectrum contains both a spectral content at zero frequency, and also a spectral content at higher frequency, both cannot be from the water mass. In this case, adaptive signal processing techniques such as finite impulse response filtering (zero Doppler suppression filter) may also be used to suppress the bottom portion of the received signal. These techniques are commonly used for similar concepts for horizontal looking radar beams to suppress clutter from fixed objects and the earth's surface in applications such as weather observation radars, and are beginning to be used in Doppler sonars. These clutter suppression techniques are well documented in publically available literature, including Appendix A hereto, and are not described further herein.

The bottom is detected at different downward beam inclinations 716, providing a horizontal profile of the bottom depth within the fan beam sector. The bottom is detected primarily by processing the echo amplitude; however, the ping-to-ping bottom correlations may also be used to aid in bottom detection.

The surface height may also be detected from the upward inclined beams, e.g., by detecting the slant range of echo amplitude increase at the water/air interface. The exemplary embodiment of the surface height detector 740 utilizes:

1. a small size and relatively wide beam transducer located on the top of the transducer assembly, and oriented vertically;
2. a transmit drive pulse passed through a T/R switch form a power amplifier;
3. a receiver amplifier to amplify the received echo; and
4. a surface detection processor to detect the surface height from the highly reflective echo from the surface.

Figure 8:
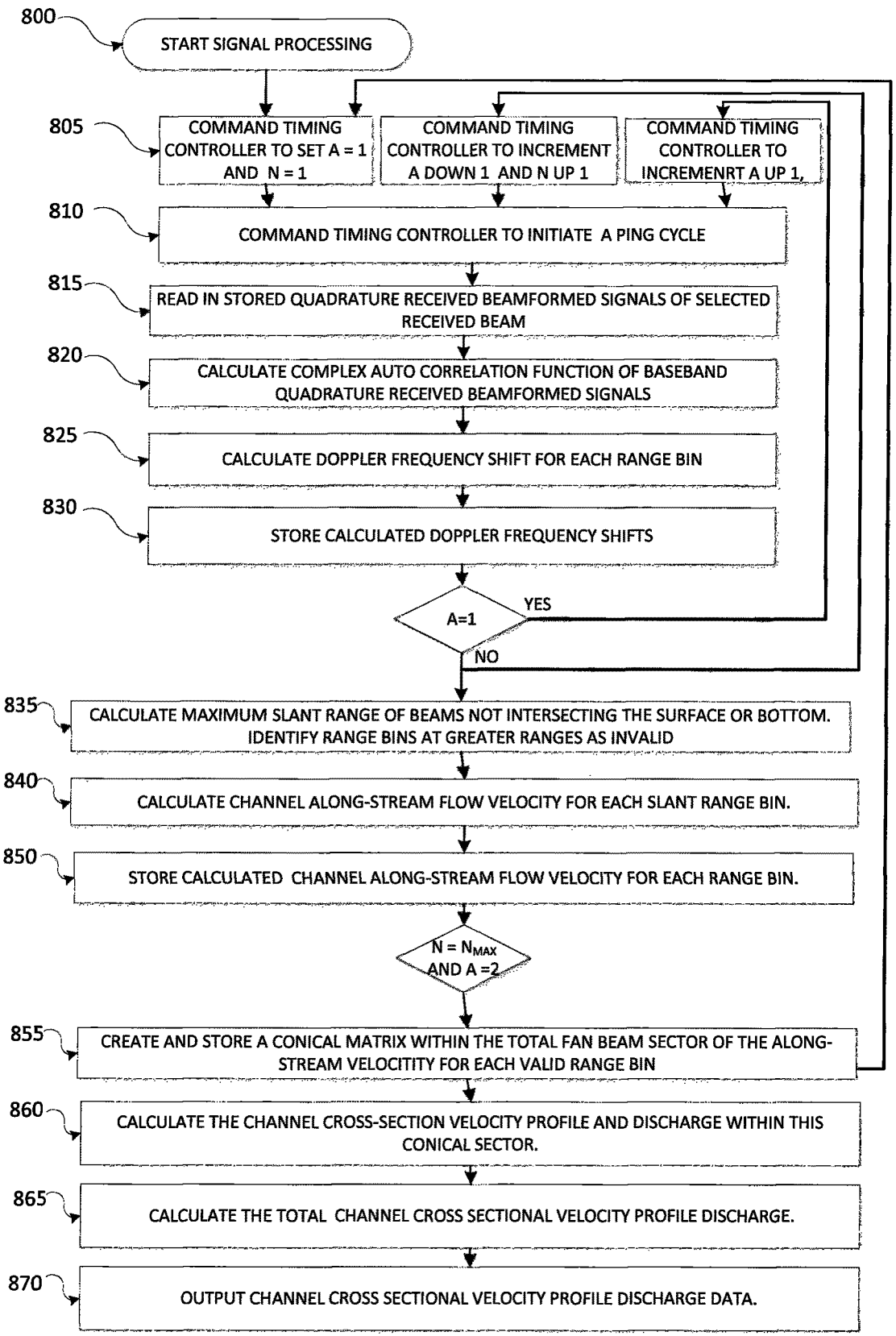
FIG. 8 is a logical flow diagram showing one embodiment of a sequence and logic in an exemplary Digital Signal Processor (DSP) for computing the Doppler frequencies, clutter suppression, velocities, cross section of the channel flow velocities within the fan shaped sector, and total channel flow velocity cross section and discharge according to the disclosure.

An exemplary DSP signal processing flow chart is shown in FIG. 8, showing the DSP signal processing process for one implementation of the disclosure. Following start of signal processing 800 for each ping cycle, the following signal processing functions are executed:

1. commands are sent to the timing controller to set system parameters to for each ping cycle, and control ping cycle timing 805;
2. command timing controller to initiate a ping cycle 810;
3. at the end of each receive range bin of the current echo received beam, read stored quadrature beamformed data for the selected bin 815;
4. compute complex autocorrelation function at a predetermined time lag (h) for the quadrature signals for each range bin 820;
5. calculate Doppler frequency shift ($F_d$) from the computed auto correlation function from the computed complex auto correlation, the time lag (h) and the sampling time interval (T) as previously described 825;
6. compute the radial beam velocities from the calculated Doppler frequencies ($F_d$), wavelength of the carrier frequency ($\lambda$) for each range bin of the selected beam as previously described 826;
7. store computed radial velocities for each range bin of selected beam for array 1 and array 2 830;
8. compute data valid regions from measured surface height, measured bottom depths and known beam angles ($\theta$) of selected beam to calculate maximum slant range of beams not intersecting the surface or bottom; identify range bin radial velocities at greater ranges as invalid 835;
9. compute along-stream profiles from range bin velocities from radial velocities for each range bin of array 1 and array 2, and known beam angles ($\theta$) of selected beams 840;

10. store computed along-stream velocity profiles 850;
11. create fan beam sector of along-stream range bin velocities for each range bin of each Z-axis inclined beam set within the selected fan beam sector 855;
12. using this conical matrix of along-stream velocities for all valid range bins, and extrapolation algorithms for invalid near surface and near bottom in-stream bins within conical sector, compute the cross section stream flow, and discharge within this conical sector 860, as illustrated in FIG. 9;
13. using this calculated cross section stream flow and channel discharge within the conical sector, known across-stream bottom contour, measured surface height, and a known extrapolation algorithm, computes a cross-section of the total channel flow velocities and discharge 865, as illustrated in FIG. 9; and
14. output this data as determined by user set parameters 870.

Thus, the array based channel monitor ADCP measures a detailed cross section of channel along stream velocities within a 100° 920 fan shaped sector 900 as illustrated in FIG. 9. For an exemplary 300 kHz carrier frequency with a 1° beamwidth, the maximum range is approximately 100 m, the along beam bin size is 1 m, providing more than 1000 individual along-stream velocity measurements. In this Figure, each bin velocity measurement is designated as $V_{\theta N}$, 910, where V designates the velocity magnitude, $\theta$ designates the inclined beam number, and N designates the range bin number along the beam. This monitored data of cross-section of the channel along-stream velocity enables more accurate estimates of the channel flow velocity distribution in the vertical and across-stream planes, as well as the total channel discharge, as compared to:

1. Existing horizontal mounted ADCP flow monitor systems, which provide only a horizontal velocity profile within a slice determined by the single pair of horizontal beams as a basis for the channel flow estimate. Also, use of solid piston transducers in such existing systems limits the vertical beamwidth to a minimum of about 3 degrees, thus limiting the profiling range due to channel boundary interference; and
2. Existing moving boat survey ADCP systems system which provide a also provides a time sample of the cross section of channel velocities and channel depth is remotely by a boat transect across the channel. Multiple short time interval survey measurements are usually impractical and expensive. The measurement intervals are typically long (several days), and channel flow may change significantly between surveys, particularly during time varying up channel conditions.

The foregoing description details certain embodiments of the disclosure. It will be appreciated, however, that no matter how detailed or specific various descriptions of the foregoing appears in text, the various features and attributes of the disclosure can be practiced in many ways, including more broadly and/or in different applications than as described herein. It should be noted that the use of particular terminology when describing certain features or aspects should not be taken to imply that the terminology is being re-defined herein to be restricted to including any specific characteristics of the features or aspects of the disclosure with which that terminology is associated.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. The foregoing description is of the best mode presently contemplated of carrying out the disclosure. This description is in no way meant to be limiting, but rather should be taken as illustrative of the general principles of the disclosure. The scope of the disclosure should be determined with reference to the claims.

EXHIBIT A-REFERENCES

| U.S. PATENT DOCUMENTS | | |
|---|---|---|
| 5,122,990 | June 1992 | Deines et al. |
| 5,208,785 | May 1993 | Brumley et al. |
| 5,343,443 | August 1994 | Merewether |
| 5,615,173 | March 1997 | Brumley |
| 5,689,445 | November 1997 | Vogt et al. |
| 5,808,967 | September 1998 | Yu et al. |
| 5,923,617 | July 1999 | Thompson et al. |
| 6,052,334 | April 2000 | Brumley et al. |
| 6,097,671 | August 2000 | Merewether |
| 6,282,151 | August 2001 | Brumley et al. |
| 6,647,804 | November 2003 | Deines |
| 6,678,210 | January 2004 | Rowe |
| 6,700,834 | March 2004 | Brumley et al. |
| 6,714,482 | March 2004 | Rowe |
| 7,317,660 | January 2008 | Brumley et al. |
| RE43090 | January 2012 | Rowe |
| 7,542,374 | June 2009 | Brumley et al |
| 7,847,925 | December 2010 | Vogt et al. |

OTHER PUBLICATIONS

Blair H. Brumley, et al., "Performance of a Broad-Band Acoustic Doppler Current Profiler", IEEE Journal of Oceanic Engineering, vol. 16, No. 4, October 1991, pp. 402-407

IEEE Ultrasonics Symposium pp. 1231-1234 (1999).

Frazier, "A two-dimensional amplitude-steered array for real-time volumetric imaging," Doctoral Thesis, University of Illinois at Urbana-Champaign, pp. 170 (April 2000).

Doppler Solutions, Feb. 28, 2003.

S. Chunying, Hzhou, H. Huang, "Radar clutter suppression using adaptive algorithms"; Aerospace conference 2004, IEEE procedings, Vol 3

J. Goss, J. Chrisman, "An introduction to WSR-88C clutter suppression", NEXTRAD weather service.

J. Bird, "Coherent Clutter Removal and Doppler Etimatiomn", Simon Frazer University, 2012

Moore, S., Le Coz, J., Pierrefeu, G., Perret, C., Hurther, D., Paquier, A., "Measuring river flow using side-looking Acoustic Doppler Current Profilers: a comparison to vertically-oriented ADCP results" (2009).

Ramon Cabrera; Jerry Mullison; and Daryl Slocum, American Society of Civil Engineers, "Side Looking Doppler Velocity Sensors", Jul. 30-Aug. 2, 2000, Morlock, S. E., 1994, Evaluation of acoustic Doppler current profiler measurements of river discharge:

"U.S. Geological Survey Water-Resources Investigation Report 95-4218, 37"

Ruhl, C. A., and Simpson, M. R., 2005, *"Computation of discharge using the index-velocity method in tidally affected areas"*, U.S. Geological Survey Scientific Investigations Report 2005-5004, 31 H. Hidayat, B. Vermeulen, M. G. Sassi, P. Torts, A. Hoitink, "Discharge estimating inn a backwater affected neandering river", March 2011

J. LeCoz, G. Pierrefeu, A. Paquier, "Evaluation of river discharges monitored by a fixed sidelooking Doppler Profiler", June 2008.

Stavros Vougioukas, Dimitris Papamichail, Pantazis Georgiou, Dimitris Papadimos, "Application note: River discharge monitoring using a vertically moving side-looking acoustic Doppler profiler".

Stephen Huddleston, Mark Zucker, Jeff Woods, Carrie Boudreau, Shane Ploos, and Christian Lopez, "Tools for Technicians; Lessons Learned in Index-Velocity Site Selection and ADVM Setup", May 2007.

URL: http://hydroacoustics.usgs.gov/indexvelocity/instruments.shtml, "Index-velocity and Other Fixed-deployment Instruments", January 2013

What is claimed is:

1. An acoustic system, comprising:
one or more discrete one-dimensional arrays, each discrete one-dimensional array consisting essentially of multiple substantially parallel first-axis rows of transducer elements, the transducer elements configured to be mounted at a location in a fluid flow channel, and to be oriented so as to ensonify across a direction of flow in the channel, the transducer elements each having an elongated dimension on an elongated axis along a face of the transducer that is longer in dimension as compared with a length dimension on the face of the transducer that is perpendicular to the elongated axis, the elongated axis on the face of one of the transducer elements being parallel with other elongated axes of other ones of the transducer elements such that the elongated axes are not collinear with one another; and
a beamformer circuit electrically connected to the transducer elements in the first-axis rows of the array, the beamformer circuit configured to delay signals associated respectively with each first-axis row.

2. The system of claim 1, wherein the orientation comprises an angular component in the first-axis and a second-axis substantially orthogonal thereto, and further comprising a prescribed angle in a third-axis which is substantially orthogonal to the first-axis and second-axis.

3. The system of claim 2, wherein the first-axis and the second-axis are substantially parallel to a plane containing a surface of the fluid flow channel, and the third-axis comprises a substantially vertical axis.

4. The system of claim 1, wherein the system is configured to sequentially and/or simultaneously form one or more sets of transmit and/or receive beam sets projected into the channel flow stream, the one or more sets each comprising an angular dispersion at least within a plane oriented substantially perpendicular to a surface of the flow channel.

5. The system of claim 1, wherein the system is configured to generate both transmit and receive beam sets, the sets each oriented with different angular components in the first-axis and a second-axis substantially orthogonal thereto, across the direction of flow in the channel.

6. The system of claim 1, where the rows are arranged substantially in a plane of rectangular, circular, elliptical or polygonal shape.

7. The system of claim 1, wherein:
the orientation comprises an angular component in the first-axis and a second-axis substantially orthogonal thereto, and further comprising a prescribed angle in a third-axis which is substantially orthogonal to the first-axis and second-axis, the first-axis and the second-axis being substantially parallel to a plane containing a surface of the fluid flow channel, and the third-axis comprising a substantially vertical axis; and
the system is configured to sequentially and/or simultaneously form one or more sets of transmit and/or receive beam sets projected into the channel flow stream, the one or more sets each comprising an angular dispersion at least within a plane oriented substantially perpendicular to a surface of the flow channel.

8. The system of claim 1, where the system is configured to transmit a signal comprising a pulse.

9. The system of claim 8, where the pulsed transmitted signal comprises a broadband coded pulse.

10. The system of claim 1, further comprising at least one solid disc piston-type vertically-oriented transducer configured to create a conical upward looking beam to be used to measure a height of a surface of the fluid flow channel above the transducer.

11. An acoustic system, comprising:
one or more discrete one-dimensional array transducers, each discrete one-dimensional array transducer consisting essentially of multiple substantially parallel rows of transducer elements associated with a first axis, each of the transducer elements having an elongated axis that is parallel, yet not collinear with, other ones of the transducer element elongated axes, the transducers configured to be mounted at a fixed location in a fluid flow channel, and oriented with an angular component in the first axis and a second axis substantially orthogonal thereto, and substantially across a direction of flow in the channel, and with an angle in a third axis substantially orthogonal to the first and second axes;
a transmit/receive switch;
a transmit beamformer circuit electrically connected via the transmit/receive switch to the elements in the rows, wherein the transmit beamformer circuit is configured to delay signals associated, respectively, with each row; and
a receive beamformer circuit electrically connected via the transmit/receive switch to the elements in the rows, wherein the receive beamformer circuit delays signals associated, respectively, with each row;
wherein the system is configured to:
set the transmit/receive switch to a transmit setting, and sequentially and/or simultaneously form one or more transmit beams projected into the fluid flow channel; and
set the transmit/receive switch to a receive setting, and sequentially and/or simultaneously form one or more receive beams projected into the fluid flow channel.

12. A method of determining fluid flow in a channel, comprising:
providing at least one one-dimensional transducer array, the at least one array consisting essentially of multiple substantially parallel X-axis rows of transducer elements arranged in a single column, each of the transducer elements being elongated along the X-axis, the rows spaced at a prescribed spacing, the at least one array disposed at a fixed location within the channel so as transversely ensonify at least a portion of the channel; and utilizing a beamformer circuit electrically connected to the transducer elements in the X-axis rows of the at least one array, applying fixed phase-delayed signals associated, respectively between the X-axis rows;

wherein an angle of a beam in a Z-axis, the beam formed by the utilizing, is determined at least in part by phase shifts associated with the beamformer circuit phase-delayed signals.

13. The method of claim 12, further comprising sequentially changing the phase shifts so as to sequentially scan the beam in angular increments within an angular sector in the Z-axis.

14. The method of claim 13, further comprising forming multiple beams simultaneously within the sector by at least using multiple phase-shift beamformer circuits operating in parallel.

15. The method of claim 12, further comprising forming multiple beams simultaneously within an angular Z-axis sector by at least using multiple phase-shift beamformer circuits operating in parallel.

16. The method of claim 12, wherein the prescribed spacing comprises approximately one-half (½) wavelength at a carrier operating frequency and sound speed associated with a relevant fluid media of the channel, and the angular sector comprises a sector of +/−50 degrees relative to a vector substantially parallel to a surface of the fluid flow channel.

17. An apparatus configured to measure a fluid flow channel, the apparatus comprising:

at least one discrete one-dimensional transducer array comprising N substantially parallel rows of transducer elements disposed relative to a first axis and arranged in a single column of transducer elements, the at least one discrete one-dimensional transducer array to be mounted at a fixed location relative to the fluid flow channel, and oriented with an angular component in both the first axis and a second axis perpendicular to the first and across a direction of flow in the channel, each of the transducer elements having an elongated dimension along a face of the transducer element that is parallel with the first axis and a dimension along the face of the transducer element that is less than the elongated dimension, the dimension being parallel with the second axis;

a transmit/receive beamformer electrically interfaced to the N rows of the at least one transducer array;

a transmit/receive switch;

first logic configured to operate the transmit/receive beamformer in a transmit mode, wherein the transmit/receive beamformer generates a set of N electrical signals, each signal being time- or phase-delayed relative to each other, and wherein the transmit/receive beamformer applies each electrical signal to its respective transducer row, the resulting time- or phase-delayed signals from each row being combined together to sequentially and/or simultaneously form one or more transmit beams projected into the fluid flow channel; and second logic configured to operate the transmit/receive beamformer in a receive mode, wherein the transmit/receive beamformer receives a set of N electrical signals, each signal being time- or phase-delayed, and wherein the transmit/receive beamformer applies each electrical signal to its respective transducer row, the resulting time- or phase-delayed signals from each row being combined together to sequentially and/or simultaneously form one or more receive beams projected into the fluid flow channel.

18. The apparatus of claim 17, wherein the apparatus is Doppler-based, and further comprises logic configured to process amplitude and Doppler frequency shifted echoes received from the fluid flow channel and a surface thereof at multiple time intervals, the intervals being on order of a transmit pulse width, so as to perform at least one of the following:

1) compute a Doppler frequency shift and velocity profile along a direction of the acoustic beams;
2) detect a slant range along each beam intersecting a bottom of the channel and the surface so as to compute a channel fluid depth at each slant range within a plurality of beams formed in an axis perpendicular to the surface;
3) combines a velocity profile and one or more depth measurements to compute a velocity flow field and discharge within a region ensonified by the plurality of beams; and/or
4) computes a total channel discharge using measured data and an extrapolation algorithm.

19. The apparatus of claim 17, further configured to generate two or more of both transmit and receive beam sets oriented with different angular components relative to a plane formed by the first and second axes, across a direction of flow in the channel.

20. The apparatus of claim 17, wherein the one or more transmit beams comprises a single tone pulse, and a Doppler frequency is computed using a complex auto-correlation method at a time delay which is a fraction of a pulse width of the pulse.

21. The apparatus of claim 17, wherein the one or more transmit beams comprises a dual phase or frequency coded pulse, and the Doppler frequency is computed using a complex auto-correlation method at a time delay approximately equal to a dual-pulse lag.

22. The apparatus of claim 17, wherein the one or more transmit beams comprises either a single tone or dual phase or frequency coded pulse, and a Doppler Frequency is computed using a complex auto-correlation method at a time delay equal to the time lag between successive pulse transmissions.

* * * * *